(12) United States Patent
Quijano

(10) Patent No.: US 8,851,544 B2
(45) Date of Patent: Oct. 7, 2014

(54) CONSOLE ASSEMBLY WITH AUTOMATIC EGRESS FOR FOREIGN OBJECTS

(75) Inventor: Jonathan Joseph Quijano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 205 days.

(21) Appl. No.: 13/435,080

(22) Filed: Mar. 30, 2012

(65) Prior Publication Data
US 2013/0256350 A1 Oct. 3, 2013

(51) Int. Cl.
*B60R 7/06* (2006.01)

(52) U.S. Cl.
USPC ........... 296/24.34; 296/37.8

(58) Field of Classification Search
CPC .... B60R 7/04; B60R 7/06; B60R 2011/0007; B60R 2011/0084; B60N 3/102
USPC ........... 296/24.34, 37.8, 37.12, 1.07
See application file for complete search history.

(56) References Cited

U.S. PATENT DOCUMENTS

| | | | |
|---|---|---|---|
| 4,792,174 A | 12/1988 | Shioda | |
| 5,460,309 A | 10/1995 | Nehl et al. | |
| 6,060,700 A | 5/2000 | Perlman et al. | |
| 7,165,798 B2 * | 1/2007 | Chamberlain et al. | 296/37.1 |
| 7,429,068 B2 * | 9/2008 | Busha et al. | 296/24.34 |
| 7,770,952 B2 * | 8/2010 | Hanzel | 296/24.34 |
| 8,033,588 B2 * | 10/2011 | Luginbill et al. | 296/24.34 |
| 2005/0133553 A1 | 6/2005 | Kim | |
| 2006/0060741 A1 * | 3/2006 | Yanagita et al. | 248/311.2 |
| 2009/0289092 A1 * | 11/2009 | Lee et al. | 224/483 |
| 2011/0095557 A1 * | 4/2011 | Myers et al. | 296/37.8 |

* cited by examiner

*Primary Examiner* — Jason S Morrow
*Assistant Examiner* — E Turner Hicks
(74) *Attorney, Agent, or Firm* — Gifford, Krass, Sprinkle, Anderson & Citkowski, P.C.

(57) ABSTRACT

A slidable tray assembly is provided having an aperture located on the housing near the track of the slidable tray assembly to promote egress of foreign objects out of the track. The housing includes a grid-like assembly to strengthen the overall housing assembly. The grid-like pattern promotes foreign objects to become stuck within the track thereby prohibiting movement of the slidable assembly. Foreign objects enter the tray by means of a gap between the slidable tray and a panel from the interior of the vehicle. The aperture located on the housing is sized in proportion to the gap created between the panel and the slidable tray.

7 Claims, 4 Drawing Sheets

CONSOLE ASSEMBLY WITH AUTOMATIC EGRESS FOR FOREIGN OBJECTS

FIELD OF THE INVENTION

This invention relates generally to vehicle console assemblies. More particularly, this invention relates to a slidable tray on a vehicle assembly on a vehicle console.

BACKGROUND OF THE INVENTION

Slidable console assemblies such as cup holders or trays provided within a vehicle console are known. However, these slidable assemblies frequently run into problems regarding foreign objects being stuck in a housing or track of the slidable assembly. Users are inclined to place objects on a top surface of a tray thus promoting foreign objects to become stuck within a track of the slidable assembly. The slidable assembly typically includes a housing having a track mounted thereon. Coins, particulate, food, or other foreign objects frequently become caught within the track on the housing thereby preventing movement of the slidable tray. Accordingly, there exists a need in the art to provide a means for egress of foreign objects to allow a tray to slide within the housing.

SUMMARY OF THE INVENTION

The present invention relates to a slidable tray assembly having an aperture located on the housing near the track of the slidable tray assembly to promote egress of foreign objects out of the track. The housing includes a grid-like assembly to strengthen the overall housing assembly. The grid-like pattern promotes foreign objects to become stuck within the track thereby prohibiting movement of the slidable assembly. Foreign objects enter the tray by means of a gap between the slidable tray and a panel from the interior of the vehicle. The aperture located on the housing is sized in proportion to the gap created between the panel and the slidable tray.

DETAILED DESCRIPTION OF THE DRAWINGS

The present invention relates to an aperture provided on a housing of a slidable tray assembly for use in an automotive vehicle. The aperture is provided within or near a track of the slidable tray. The aperture is proportioned directly to the aperture created by the slidable tray and the panel of the assembly. The aperture is large enough to promote egress of foreign objects through the aperture.

Figure 1:
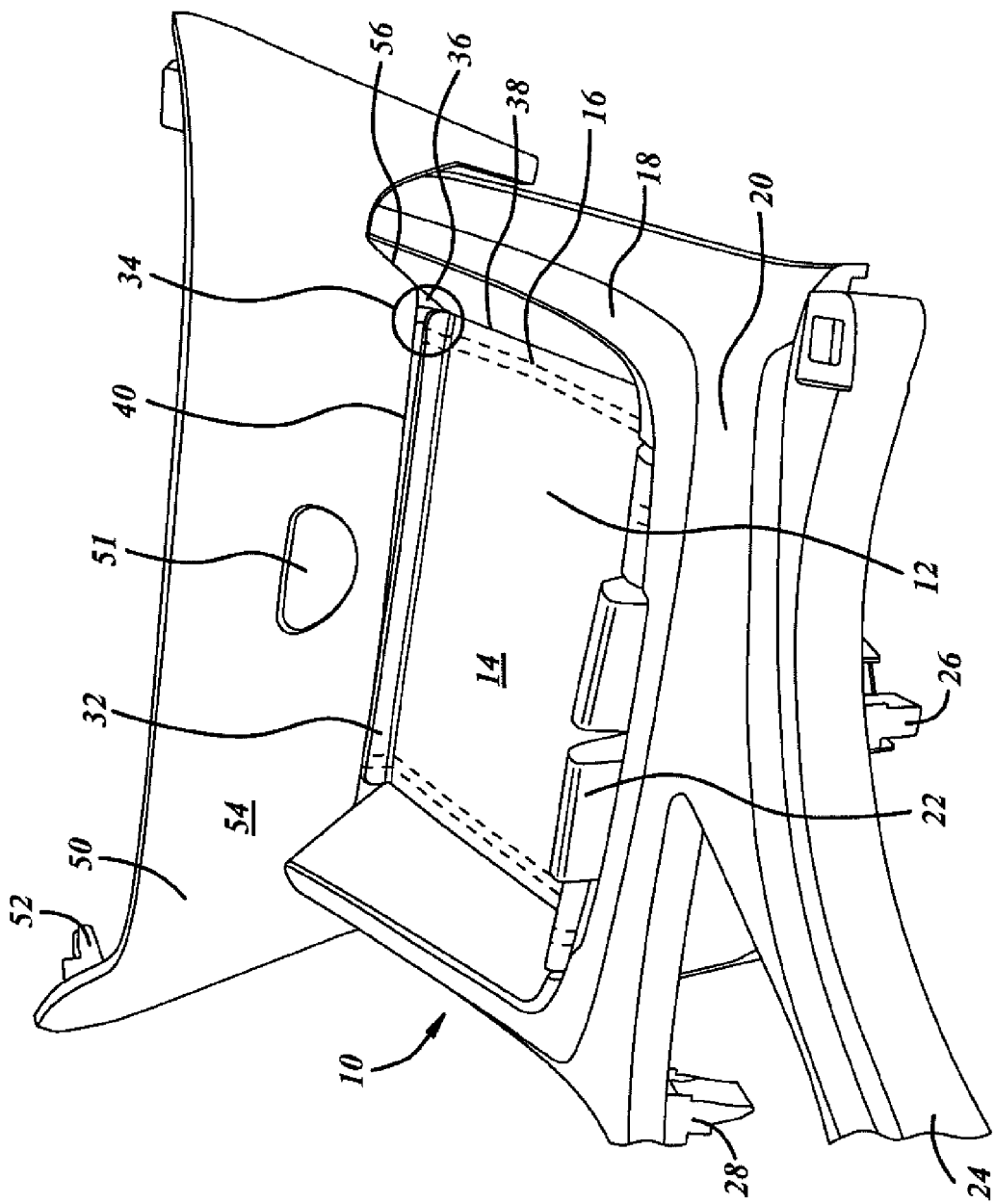
FIG. 1 illustrates a perspective environmental view of the sliding tray having a gap between the panel and the tray.

FIG. 1 illustrates a perspective environmental view of the tray assembly 10 having a tray 12. Tray 12 includes an upper surface 14 including stitching 16. The tray assembly 10 further includes trim paneling 18, 20 to house the tray assembly 10. The upper surface of the tray 12 may be leather, plastic, polymer, or polymer-like material. The stitching 16 may either be real stitching or artificial stitching to give the look of a stitched surface. The handle 22 attached to the tray 12 allows a user of a vehicle to push the tray 12 forward into the console of the vehicle. Further trim piece 24 promotes to the overall look of the tray assembly. Attachment structures 26, 28 attach the tray assembly 10 to the main body of the vehicle.

The tray 12 and surface 14 are used by the user of the vehicle to place items such as a cell phone, loose change, or other objects onto. An aperture 36 (also shown by reference numeral 34) is created by the space 38 between the panel 50 and the tray 12. The aperture 36 is also created by trim pieces 56 of the tray assembly 10. The space 38 created between the tray 12 and the trim pieces 18, 56 is larger at the point where the back of the tray 40 meets the panel 50. The panel 50 includes a first surface 54 and various attachment structures 52. The first surface 54 of the panel 50 further includes decorative elements such as aperture 51. The tray 12 includes a flange 32 operable to prevent large objects from getting caught in the housing. The aperture 36 is minimized to prevent large objects from moving off of the tray 12 into the housing of the tray assembly 10.

The aperture 100 may be varying sizes and dimensions. In the present embodiment, the aperture 100 is generally rectangular. In secondary embodiments the aperture 100 may be square, circular, triangular . . . etc. depending on the requirements of the tray assembly 10. The aperture 100 has predetermined measurements. In the present embodiment the aperture 100 varies between 0.1 and 2 square inches. This predetermined dimension is calculated based on the aperture 36 created by the tray 12 and the panel 50.

The housing 70 and tray 12 is generally made of a plastic, plastic-like, polymer, polymer-like . . . etc. material. The material is strong enough to withstand numerous open-closing cycles.

Figure 2:
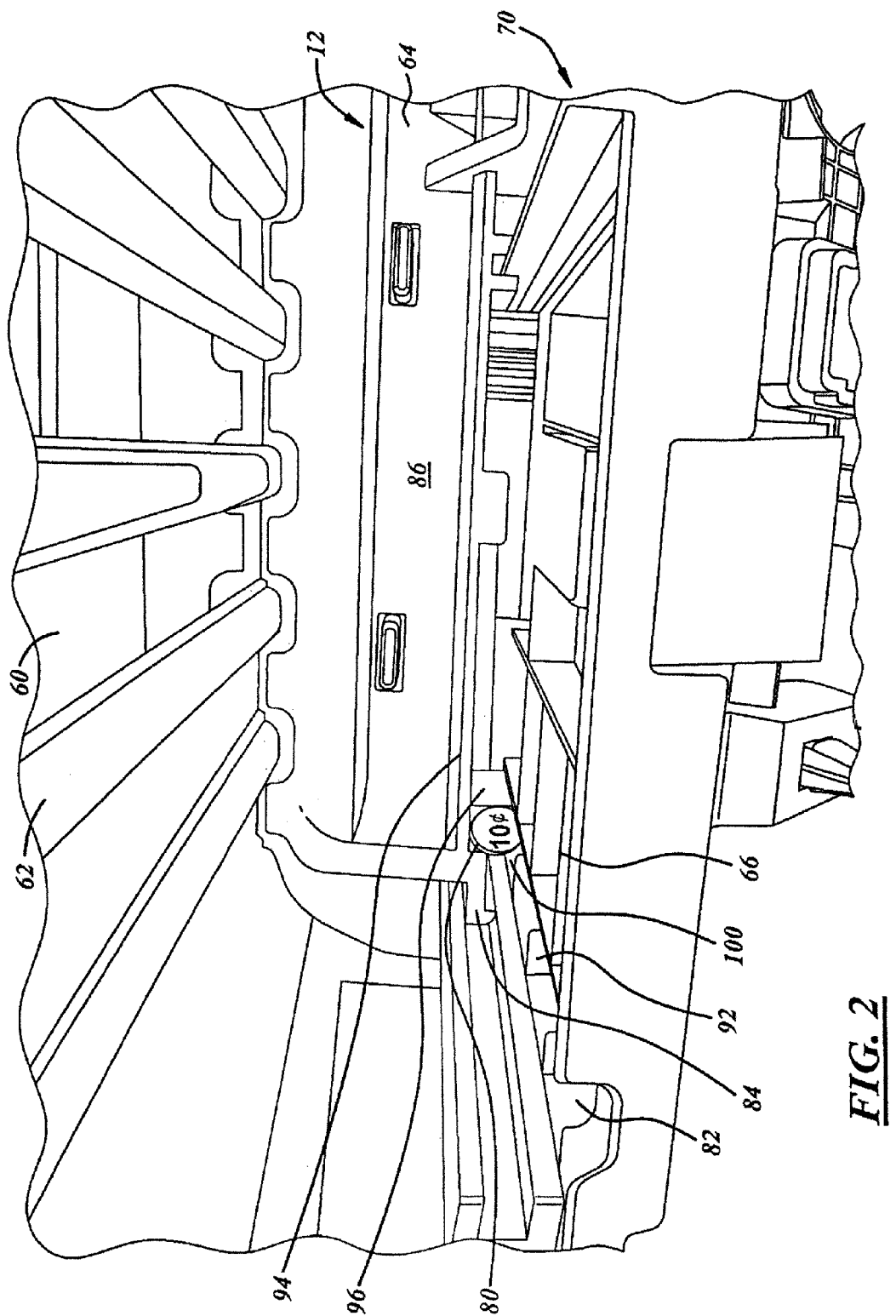
FIG. 2 illustrates a perspective rear underside view of the slidable tray and track.

FIG. 2 illustrates a rear perspective view of the tray 12 and of the housing 70. The housing 70 includes a grid-like structure 66 to improve the strength of the housing 70. The grid-like structure 66 includes various panel-like members 92. Foreign objects such as the coin 80 frequently become stuck within one of the grid structures. The housing 70 includes an upper panel 60 having support structure 62. The tray 12 includes a back side 64 having a back surface 86. The back side 64 of the tray 12 includes a lower surface 94. The back surface 64 of the tray 12 will come into contact with the coin 80 and thereby prevent further movement of the tray 12 into the housing 70. Various other structural elements 96, 84 are provided within the housing 70.

The track 82 of the housing 70 allows the tray 12 to pass over the track 82. The track 82 further includes grid-like structural elements to promote the strength of the housing 70. When a coin 80 becomes trapped within one of the grid-like structures within the track 82, the aperture 100 provided within the track allows the coin 80 to egress the housing 70. Allowing the coin 80 to exit the housing 70 allows for the tray to move into the housing 70 and function as it is supposed to.

Figure 3:
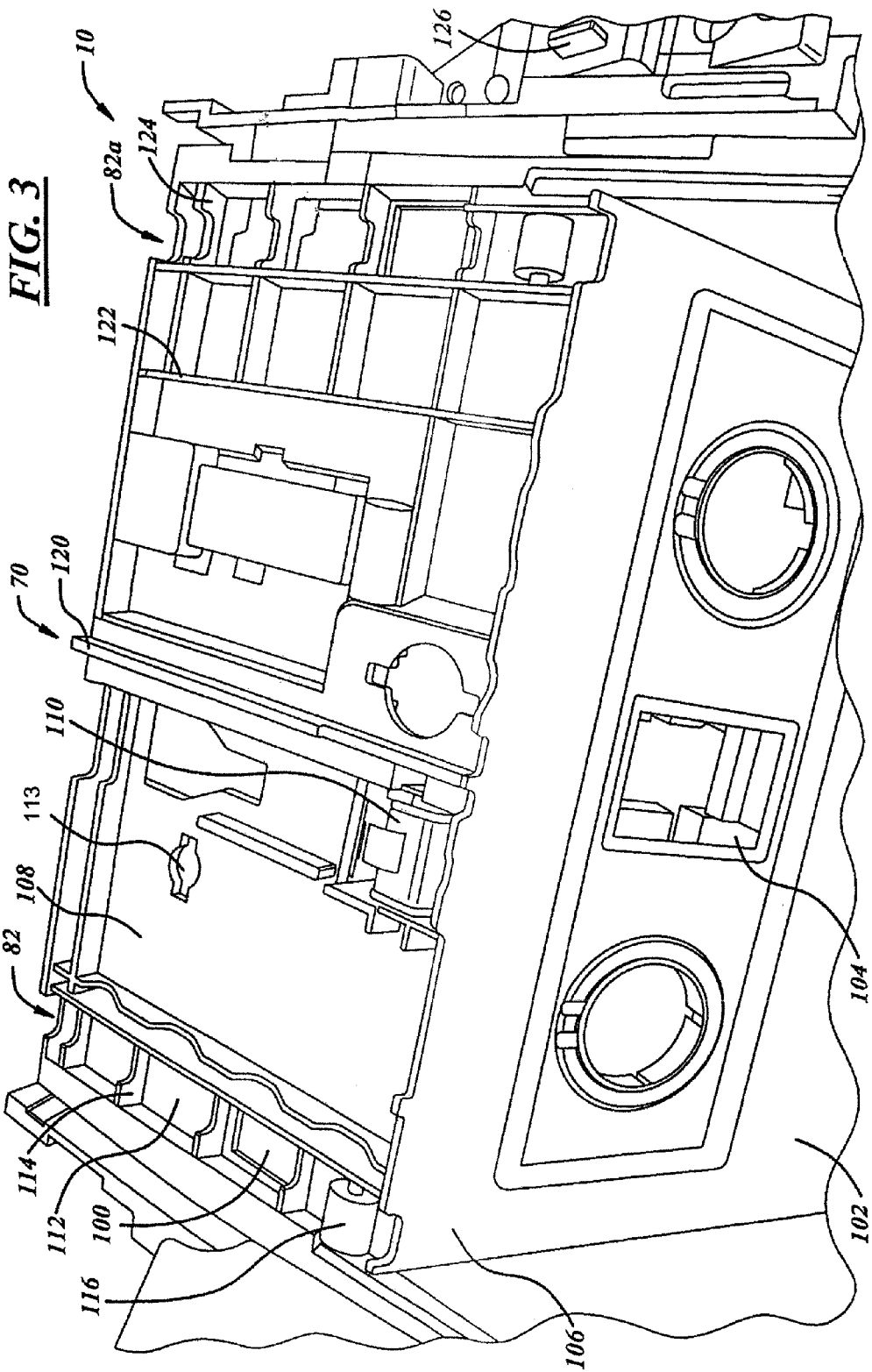
FIG. 3 illustrates a perspective view of the housing showing the aperture.

FIG. 3 illustrates a perspective view of the top side of the housing of the tray assembly 10. The track 82 is shown having various structural support elements 114 creating a grid-like pattern. The track 82 includes a lower surface 112 and a roller 116. The roller 116 is provided covered with a fabric or felt-like material. The aperture 100 is provided on the lower surface 112 of the track 82. The aperture 100 is shown in a rectangular arrangement. Alternatively, the aperture 100 may be square, circular, or other geometrical shape to suit the requirements of the assembly.

The aperture 100 is dimensioned in proportion to the aperture 36 as shown in FIG. 1. If a foreign object can enter the aperture 36, then the aperture 100 is made large enough to promote egress of that foreign object through the aperture 100.

The assembly 10 further includes housing elements such as a surface 108 having a connection aperture 113. The tray 12 is connected to a tray assembly 10 and is moved by means of the spring 110. Various other structural elements 120, 122, 124, 126 promote the overall strength of the housing 70. The tray 12 is used to cover the compartment 102 including electrical components 104 on a panel 106.

As the tray 12 is pushed into the housing 70, the rear surface 86 of the tray 12 pushes the coin 80 in the track and through the aperture 100. If the aperture 100 was not in place, the coin 80 would remain stuck within the grid structure of the track 82 thereby preventing any further movement of the tray 12. This prevention of movement of the tray 12 fully prevents any future use of the tray 12.

Figure 4:
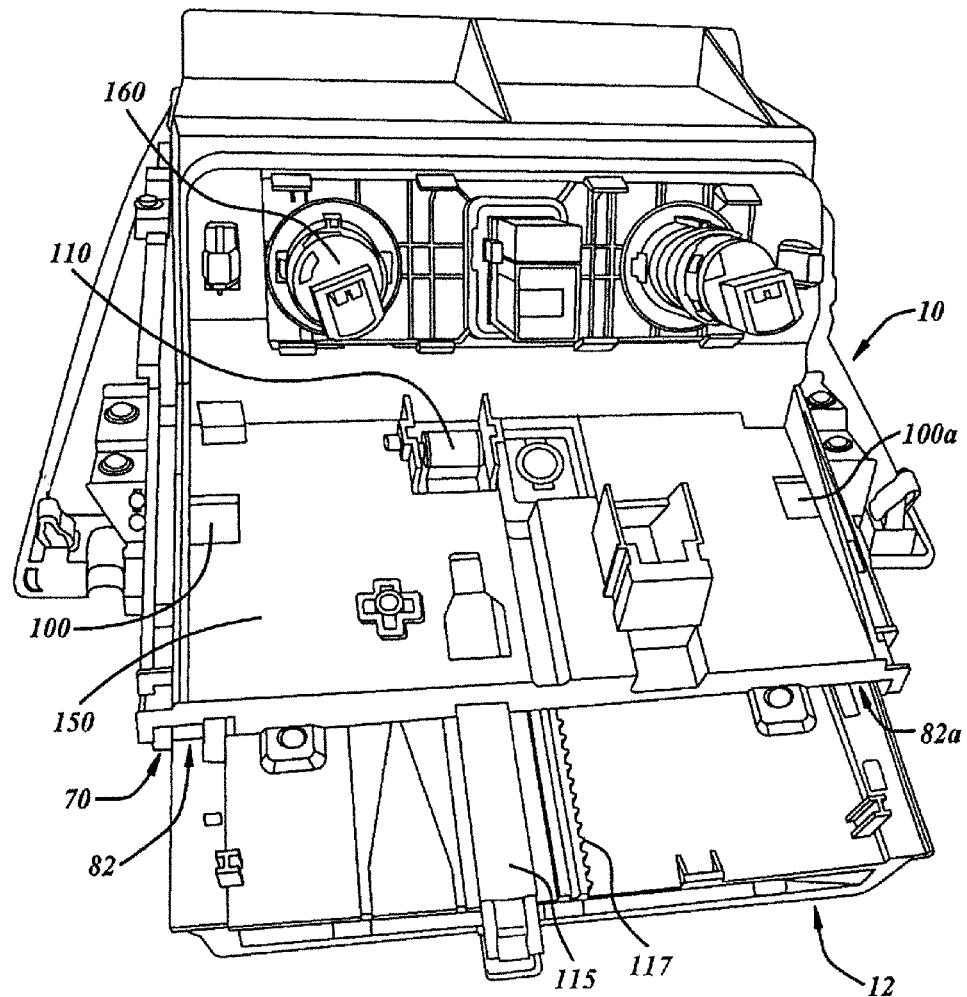
FIG. 4 illustrates a perspective view of the underside of the assembly showing the aperture.

FIG. 4 illustrates the underside of the tray assembly 10. The tray is shown mounted into the housing 70. The underside surface 150 of the housing 70 is shown having apertures 100, 100a. In this embodiment two apertures are provided on both tracks 82, 82a. The underside of the housing and tray assembly 10 further shows electrical components 160 provided within the compartment. The underside of the tray further shows gear teeth 117 and attachment structures 115 promoting to the movement of the tray 12 within the tray assembly 10.

This invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A slidable tray assembly for an electronic storage compartment cover, the tray acting as a cover for the compartment, the assembly mounted within a vehicle console, the assembly comprising:
   a housing having at least one track, the at least one track each having at least one aperture, the at least one aperture positioned on a horizontal surface within the at least one track, the horizontal surface having a plurality of grid supports, the at least one aperture extending between the plurality of grid supports on the horizontal surface, the at least one aperture positioned above an open space under the housing;
   a tray supported for reciprocal movement along the at least one track, the tray operable to slide within the housing; and
   the at least one aperture disposed on the at least one track within the housing, the at least one aperture operable to facilitate egress of foreign objects in the at least one track of the housing.

2. The assembly of claim 1 wherein the plurality of grid supports form a rectangular configuration.

3. The assembly of claim 1 wherein the at least one aperture is rectangular.

4. The assembly of claim 1 wherein a panel is mounted adjacent the housing and the tray creating a space of predetermined dimension between the panel and the tray.

5. The assembly of claim 1 wherein the at least one aperture on the housing ranges between 0.1 square inches and 2 square inches.

6. The assembly of claim 1 wherein a first grid support and a second grid support are provided spaced apart from one another.

7. The assembly of claim 6 wherein the at least one aperture extends between the first grid support and the second grid support.

* * * * *